United States Patent
Baher

[11] 3,826,013
[45] July 30, 1974

[54] COMBINED LEVEL, SQUARE AND PLUMB TOOL

[76] Inventor: Bernard H. Baher, 52 E. High St., Avon, Mass. 02322

[22] Filed: Dec. 13, 1972

[21] Appl. No.: 314,715

[52] U.S. Cl. .................................. 33/390, 33/373
[51] Int. Cl. .......................... G01c 9/28, G01c 9/36
[58] Field of Search ............ 33/340, 341, 343, 347, 33/370, 371, 372, 373, 379, 384, 387, 390, 391, 21 C, 88, 89

[56] References Cited
UNITED STATES PATENTS

| | | | |
|---|---|---|---|
| 407,285 | 7/1889 | Ensminger | 33/89 X |
| 1,017,457 | 2/1912 | Perlik | 33/391 |
| 1,794,254 | 2/1931 | Sherwood | 33/384 X |
| 2,624,953 | 1/1953 | Newcomb | 33/372 |
| 2,844,874 | 7/1958 | Sury | 33/21 C |
| 3,106,024 | 8/1963 | Lea | 33/347 |
| 3,545,091 | 12/1970 | Sebastiani | 33/382 X |

FOREIGN PATENTS OR APPLICATIONS
873,961  6/1971  Canada.................................. 33/390

Primary Examiner—Louis K. Prince
Assistant Examiner—Charles E. Phillips
Attorney, Agent, or Firm—Edgar O. Rost

[57] ABSTRACT

A measuring instrument is disclosed to level, square and plumb adjacent and opposite surfaces of cylindrical, curved, inclined and planar shaped objects. A body member having right-angular arms with mutually perpendicular included-angle grooves for accommodating the contacted object surfaces being measured is an embodiment of the invention. Means to indicate the degree of level in the horizontal and vertical planes throughout 360° are provided in each arm and include liquid or "bulls-eye" target vials. Alternatively, a single level means may be utilized in either right-angular arm member.

3 Claims, 13 Drawing Figures

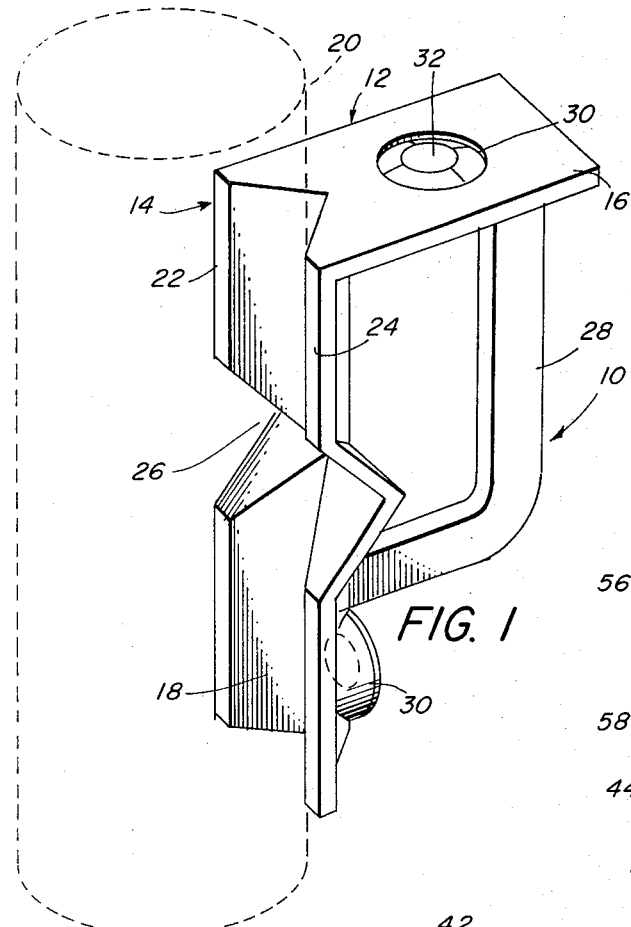
FIG. 1
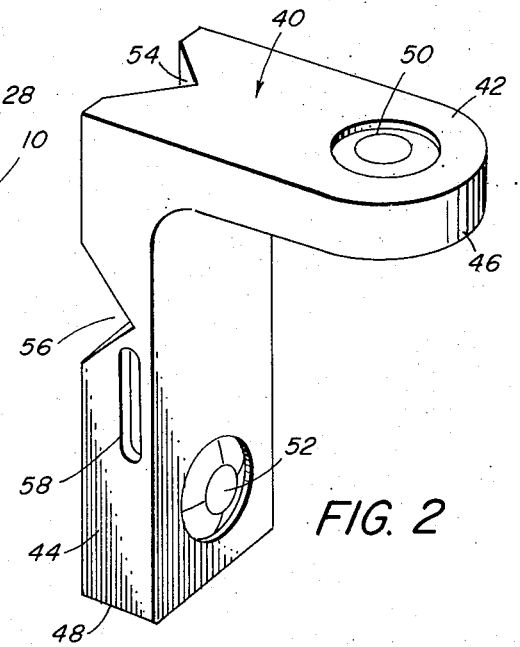
FIG. 2
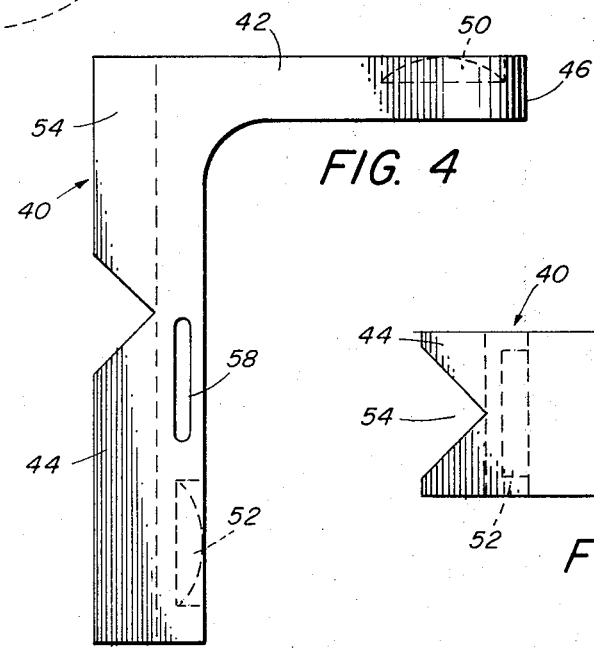
FIG. 4
FIG. 3

COMBINED LEVEL, SQUARE AND PLUMB TOOL

BACKGROUND OF THE INVENTION

1. Field of the Invention

The invention relates to measuring instruments and, more particularly, to a tool for leveling, squaring and plumbing any individual or interconnected objects of any shape for use by builders, carpenters, plumbers, machinists and the like.

2. Description of the Prior Art

A multitude of tools combining the leveling and squaring functions have evolved in the measuring instrument field. Folding or extendible structures together with protractors or miter bevels, with or without bubble type levels, may be found available commercially and in the patented art. One example of such art is found in the U.S. Pat. No. 613,946 issued Nov. 8, 1898 to Laroy S. Starrett. This device provides a level frame having arms of equal thickness and rigidly joined at right angles with two lateral openings on one side of the frame in each arm with leveling glasses in the openings. Additionally, the disclosed patented structure provides an edge opening with a leveling glass in the edge of the frame perpendicular to the one side. With this measuring instrument it is possible to determine the horizontal and vertical displacement of a flat piece of lumber on which the tool is positioned. The surfaces of the contacted object as well as, the arms of the level frame, are always planar which limits the usefulness of the tool for other shaped objects.

Similarly, the conventional square or level tools all have flat engaging surfaces and elongated rectangular box or torpedo type frames. This results in rather cumbersome devices which are difficult to store and are quite expensive. Now the requirement for planar surfaces engaging the objects being measured leads to considerable difficulty in leveling, squaring and plumbing nonplanar objects such as pipes, posts, stockade fencing, rails, sewerage and drainage pipes and the like. Machinists, pipefitters, plumbers, landscapers, shipfitters as well as carpenters, builders, and the like have, therefore, been obligated to attempt to utilize the prior art tool embodiments which were designed solely for flat surfaces. When dealing with curved, cylindrical, round or other shaped objects difficulties arise with respect to accuracy and positioning which are both costly and time consuming to correct.

A need arises, therefore, for a unique and improved tool for leveling, squaring and plumbing of any surface individually or when interconnected with another object.

SUMMARY OF THE INVENTION

In accordance with the present invention a tool is provided having a body member with right-angular arm portions. A first object-engaging and accommodating means is defined by an elongated groove having in included angle in one of the arm portions. A second object-engaging and accommodating groove extends mutually perpendicular to the first groove at an intermediate point. Hence, the first groove having a substantial V-shape extends throughout the length of one arm portion while a second similar shaped groove extends perpendicularly and spans the width of the same arm portion.

Leveling means such as target type 360° vials are positioned in each of the right angular arms to provide a capability of determining both the horizontal and vertical orientation of any object. The tool may be used to determine the level and plumb of any shaped object individually. In the case of joined, interconnected objects each of the mutually perpendicular grooves will contact an adjacent surface. It is also possible to square any right angular objects, such as ceiling joists, rafters, partitions and the like.

The tool may be fabricated by metal die casting techniques of a suitable material. Plastic having the desired rigidity may also be employed. To facilitate the use of the tool a handle may be embodied as a component of the body member. Further, slots may be cast as an integral part of one of the arm portions for strapping the tool to the object or carrying.

An additional feature of the invention will provide a predetermined pitch for round or flat objects. A movable extendible member is appended to a body member and wall. After movement to the desired setting the movable member is secured in its extended position to elevate one end of the tool for a reading of the level means with the pitched variation.

A unique level, square and plumb tool is, therefore, disclosed and with the provision of grooves adapted to fit any object an accurate measurement and orientation of objects having nonplanar as well as planar surfaces is now possible.

BRIEF DESCRIPTION OF THE DRAWINGS

The invention as well as details for the provision of preferred embodiments will be readily understood after consideration of the following description and reference, to the accompanying drawings, wherein:

FIG. 1 is an isometric view of one illustrative embodiment of the invention;

FIG. 2 is an isometric view of another illustrative embodiment of the invention;

FIG. 3 is a top elevational view of the embodiment shown in FIG. 2;

FIG. 4 is a side elevational view of the embodiment shown in FIG. 2;

DESCRIPTION OF PREFERRED EMBODIMENTS

Figure 5:
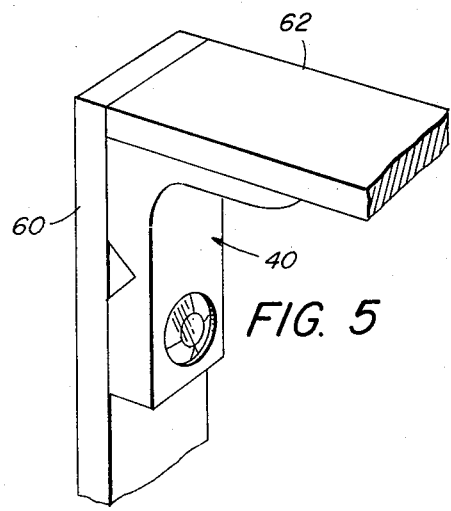
FIGS. 5 and 6 are isometric-views of an embodiment of the invention utilized in squaring applications.

Referring now to FIG. 1 the illustrative embodiment 10 comprises a body member 12 of a suitably rigid material, such, as a metallic-die casting, having right-angularly disposed arm portions 14 and 16. A first elongated groove 18 adapted to engage and accommodate any object, for example, cylinder 20 which can represent a post, rod, pipe or conduit. In an exemplary embodiment an included angle of 90 degrees was found to be quite suitable. Groove 18 having a substantial V-shape extends substantially throughout the length of arm 14 and substantially flat wall surfaces 22 and 24 are provided on either side. These surfaces 22, 24 are useful when the tool is utilized for squaring or leveling of flat surface objects. The configuration of groove 18 can also be suitably varied such as being curved. The length of arm 14 which is typically vertical oriented may be slightly longer than arm 16 which is generally in a horizontal position in most applications.

Mutually perpendicular to the principal direction of groove 18 is a second object-engaging and accommodating groove 26 which extends substantially across the width of arm 14. This groove is shown as V-shaped in the same manner as groove 18 and is positioned at an intermediate point. Other variations, of course, would be permissible to accommodate different surfaces. A handle 28 is joined to the respective arm portions 14 and 16.

Leveling means to indicate the orientation in both the horizontal and vertical plane include a target type "bulls-eye" 360 degree liquid vial 30 disposed in both or only one of the arms. Such leveling devices provide a floating component 32 which is positioned in as near to a center position as possible in leveling or plumbing the object being measured. Such leveling means 30 are desirably recessed within the arm portion in order to prevent interference with flat surfaces 22 and 24 or the outer wall surface of arm 16 in squaring applications. Other types of leveling means may be readily substituted for the disclosed vials.

In FIGS. 2, 3 and 4 an alternative embodimetn 40 is shown and right-angular arms 42 and 44 are provided with a rounded end 46 and straight end wall 48. This variation increases the scope of number of possible applications. Leveling means 50 and 52 are recessed below the planar surfaces of the arms. Elongated V-groove 54 is similarly oriented as the groove 18 in FIG. 1 and second groove 56 is perpendicularly disposed in the same arm 44.

A new variation in this embodiment comprises aligned slots 58 in the lateral side walls of arm 44. Such an arrangement permits a strap to be inserted for fastening the tool to the object being measured or carrying it. The embodiment is also fabricated of a metal or suitable plastic material.

Figure 6:
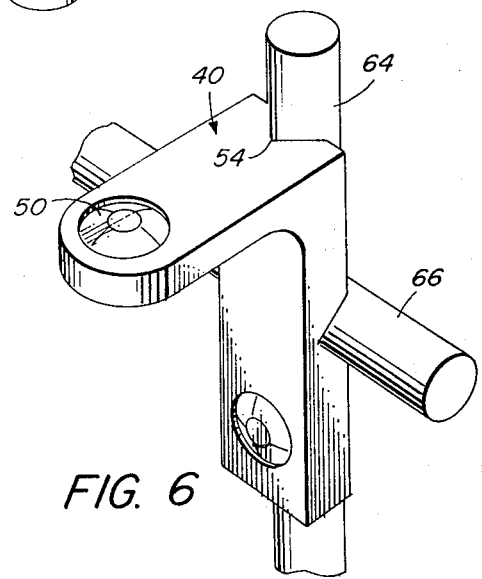

In FIGS. 5 and 6 the tool is illustrated first in squaring two connected pieces of lumber 60 and 62 to form a right angle. In this measurement the flat surfaces of arms 42 and 44 engage the object. In the second application the tool is used to provide a squared joint with round poles or rods 64 and 66. Groove 54 accommodates pole 64 and groove 56 engages pole 66. In addition to squaring the level means 50 in arm 42 provide for plumbing the interconnected poles. This demonstrates an ideal tool available for fence and stockade structure erection.

Figure 7:
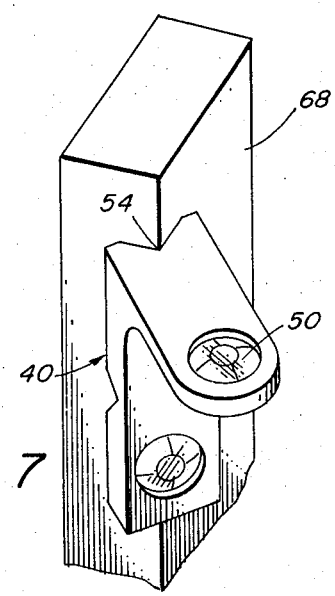
FIGS. 7, 8, 9 and 10 are isometric views of an embodiment of the invention utilized in leveling and plumbing applications.

FIGS. 7-10 inclusive illustrate several leveling and plumbing applications. In FIG. 7 groove 54 is positioned against an upright piece of lumber or metal 68 and the plumb of the object is attained by reading level 50.

Figure 8:
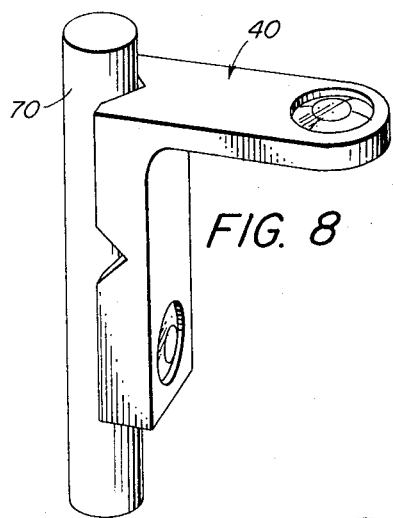
Figure 9:
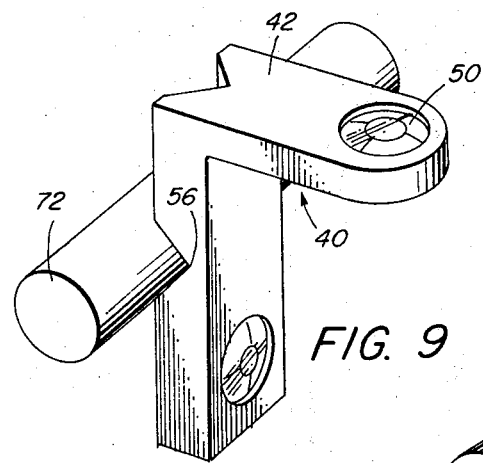
Figure 10:
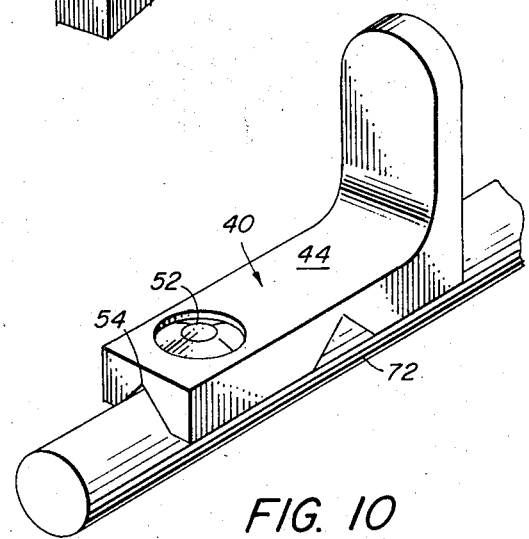

In FIG. 8 the same groove 54 accommodates round post 70 and the level 50 facilitates a plumb measurement in any direction throughout 360 degrees. In FIG. 9 the second groove 56 engages a horizontal round post 72, such as a rail fence and level 50 permits the perfect orientation of this object in a horizontal plan. In FIG. 10 the horizontal alignment of a round post 72 is attained by reading level 52 in arm 44 after positioning the tool with V-shaped groove 54 engaging the object being measured. It is also possible to measure any flat surfaces with the tool by positioning arm 44 on the object. Additionally any object can be measured to determine level and plumb characteristics using the flat lateral side walls of the tool or the flat end wall 48.

Figure 11:
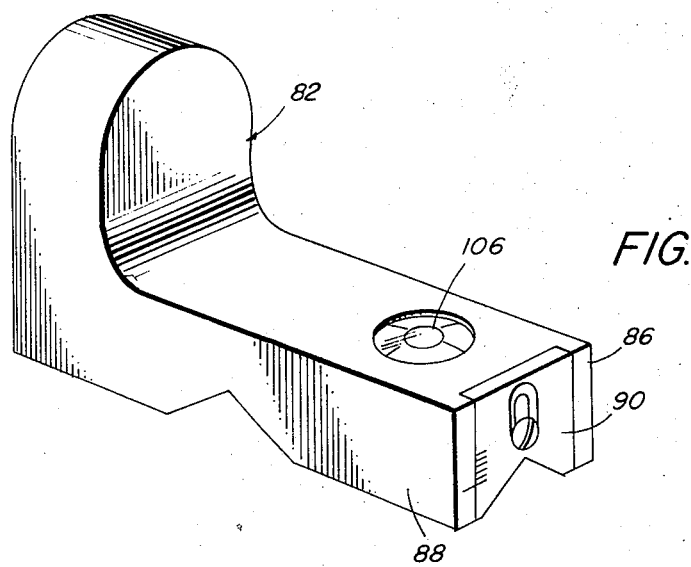
FIG. 11 is an isometric view of an alternative embodiment of the invention.
Figure 12:
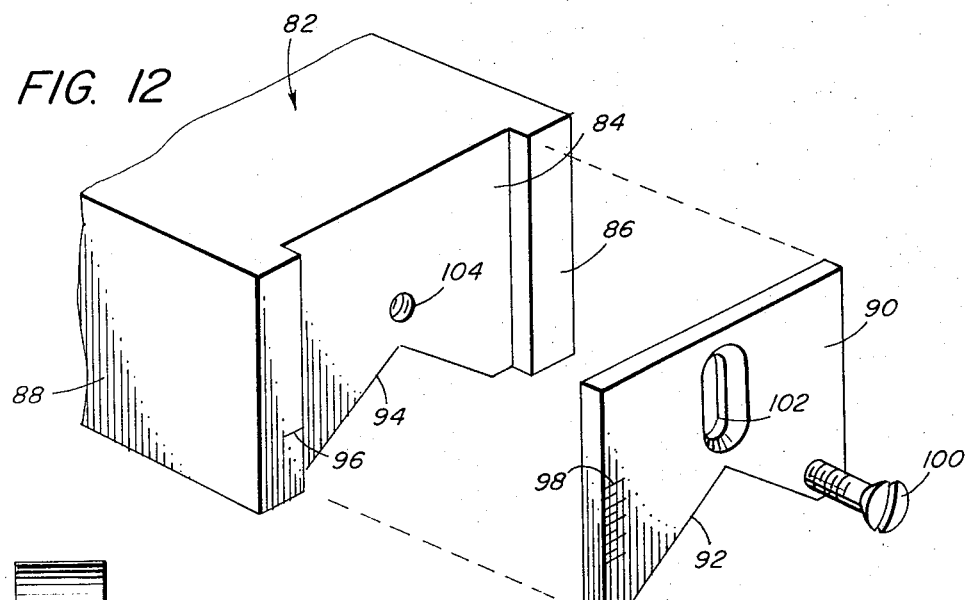
FIG. 12 is an exploded isometric-view of a portion of the embodiment shown in FIG. 11.
Figure 13:
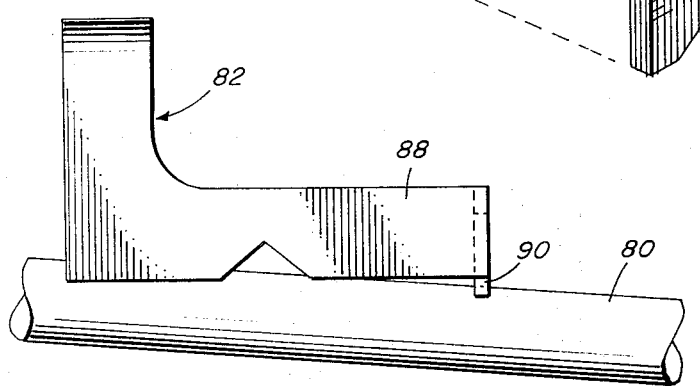
FIG. 13 is a side elevational view of the embodiment shown in FIGS. 11 and 12 utilized in pitch variation applications.

FIGS. 11-13 inclusive illustrate an application for adjusting and varying the pitch of objects such as pipes 80 or flat surfaces where a runoff slope is desired. The tool 82 is varied by providing a channel 84 in end wall 86 of arm 88. A movable extendible member 90 is dimensioned to be positioned inside the channel 84 and a V-shaped notch 92 is provided to mate with V-shaped groove 94 in arm 84. Reference markings 96 and 98 provide for the predetermined setting of the positioning of movable member 90. After movement to the desired setting member 90 is secured within channel 84 by any suitable means such as a threaded bolt 100 extending through slot 102 to engage threaded aperture 104 in arm 88. Target level 106 recessed in arm 88 provides for the horizontal reading throughout 360 degrees.

There is thus disclosed a useful tool for a large number of applications, particularly for leveling, aquaring and plumbing nonplanar surfaces of any type in additon to performing such functions with flat surface objects. Numerous variations, alterations and modifications will suggest themselves to those skilled in the art. It is intended, therefore, that the foregoing detailed description of the invention and preferred embodiment be considered in the broadest aspects and not in a limiting sense.

I claim:

1. A tool comprising:
    a body member of a substantially rigid material having right angular arm portions each having a substantially flat surface;
    mutually perpendicular first and second object accommodating means comprising recessed grooves defining an included angle provided in the surface opposite said flat surface of one of said arm portions; and
    target type spirit level means for indicating the degree of displacement of an object engaged by said body member grooves throughout 360° with one positioning in a horizontal or vertical direction mounted in the flat surface of each of said arm portions.

2. The tool according to claim 1 and means comprising slots in the sidewalls of said body member for accepting means for encircling and securing said tool to said object.

3. A combined level, square and plumb tool comprising:
    a body member of a substantially rigid material having right angular arm portions with substantially flat outer surfaces;
    first object accommodating means comprising an elongated recessed groove defining an included angle extending substantially throughout the length of the surface opposite said flat surface of one of said arm portions;
    second object accommodating means comprising a recessed groove defining an included angle extending mutually perpendicular to said first groove at an intermediate point and substantially across the width of said one of said arm portions; and
    target type liquid level means for indicating the degree of displacement of an object engaged by said body member grooves throughout 360° with one positioning in a horizontal or vertical direction mounted in the flat surface of each of said arm portions.

\* \* \* \* \*